United States Patent [19]

DeMarco

[11] 4,245,077
[45] Jan. 13, 1981

[54] STABILIZED ACID-CONTAINING ANAEROBIC COMPOSITIONS

[75] Inventor: JoAnn DeMarco, Wethersfield, Conn.

[73] Assignee: Loctite Corporation, Newington, Conn.

[21] Appl. No.: 891,235

[22] Filed: Mar. 29, 1978

[51] Int. Cl.³ .............................................. C08F 22/10
[52] U.S. Cl. ................................. 526/323.1; 526/313; 526/323.2; 526/328
[58] Field of Search .................. 526/323.1, 323.2, 320, 526/328, 329.7, 313

[56] References Cited

U.S. PATENT DOCUMENTS

| 3,479,246 | 11/1969 | Stapleton | 526/323.1 |
| 3,547,851 | 12/1970 | Frauenglass | 526/323.1 |
| 3,625,930 | 12/1971 | Toback et al. | 526/323.1 |
| 3,682,875 | 8/1972 | O'Sullivan et al. | 526/323.1 |
| 3,925,322 | 12/1975 | Azuma et al. | 526/323.1 |

Primary Examiner—Harry Wong, Jr.
Attorney, Agent, or Firm—Jean B. Mauro; J. Rodney Reck

[57] ABSTRACT

Anaerobic compositions containing strong acid impurities and/or strong acid precursors are neutralized and stabilized against the degrading effects of pH decrease during storage by adding about 0.1 to about 10 percent by weight of the total composition of an epoxy.

29 Claims, No Drawings

STABILIZED ACID-CONTAINING ANAEROBIC COMPOSITIONS

BACKGROUND OF THE INVENTION

Anaerobic adhesive and sealant compositions have come into prominence in recent years because of their superior performance and convenience as thread-lockers and sealants and for various other important uses in machine assembly. Anaerobic compositions have been described in detail in U.S. Pat. Nos. 2,895,950; 3,218,305; 3,425,988; and 3,435,012, among others, as well as British Specification No. 1,412,940. The compositions depend on the generation of free radicals, normally by a redox-type reaction catalyzed by the metallic surfaces to which the compositions are applied in use, or by pre-applied primers. It has also been found that some of these compositions can be cured by exposing them to non-ionizing radiation, such as UV light; this is disclosed in French Pat. No. 73.17729.

An anaerobic composition has as required elements a free radical polymerizable monomer (normally a mono-, di- or triacrylate or methacrylate) and a peroxy initiator or a photo-initiator, or both. It may include accelerators, such as amines and organic sulfimides. When such a composition is required to cure under irradiation such as UV, it must also include at least one photo-initiator or sensitizer such as benzoin methyl ether or one of the initiators described in Australian Patent 469,564. The composition may also include polymeric thickeners, coloring agents including those pigments used in reflective coatings, and plasticizers. Free radical stabilizers may also be required to balance the shelf life of the compositions against the speed of cure. These stabilizers are normally of the quinone type, and the preferred quinones are beta-naphthoquinone, 2-methoxy-1,4-naphthoquinone, and p-benzoquinone. Other stabilizers are disclosed in U.S. Pat. No. 3,043,820. Compatible plasticizers may optionally be used, the preferred plasticizers being selected from the group of polyester polymeric plasticizers described in U.S. Pat. No. 3,794,610.

Among the most common and useful monomers are those commonly designated polyethyleneglycol dimethacrylate (PEGMA), tetra-ethyleneglycol dimethacrylate (TEGMA) and triethyleneglycol dimethacrylate (TRIEGMA). These and other anaerobic monomers are typically manufactured by processes using the well-known catalytic action of strong acids such as sulfuric acid, methane sulfonic acid and para-toluene sulfonic acid. The monomers as commercially available usually contain significant residual concentrations of such strong acids as impurities. In addition, the manufacturing process typically forms precursors of strong acids, e.g., labile esters, which also remain in the monomers as sold. These residual precursors tend to hydrolyze or decompose during storage of the monomers, even at room temperature, to form strong acids in situ.

It has been known for some years that the presence of such strong acids and precursors tends to cause an undesirably low initial pH as well as a gradual reduction of pH of the monomer (known as "acid drift") which, in turn, degrade the shelf life and performance of the anaerobic composition. Various methods have been tried to correct and control acid drift. For example, alumina and inorganic bases such as sodium hydroxide have been used. Such chemicals will neutralize acids and are more or less effective stoichiometrically; however, they can not effectively be used to control the in situ acid formation since the necessary excess of such bases would itself destabilize the anaerobic composition.

Similarly, organic bases such as amines have been tried. While they will also react stoichiometrically, they cannot be left present in excess since they tend to accelerate the anaerobic cure reaction and thus destabilize the composition.

Accordingly, a method of correcting too low pH and controlling acid drift in monomer would be a very worthwhile advance in anaerobic technology.

While epoxy compounds have been used to stabilize various polymerized systems, e.g., polyvinyl chloride resin (see, for example, May & Tanaka, Eds, "Epoxy Resins," Chapter 10, Marcel Dekker, N.Y. (1973)), they have not been kown for use in reactive, "living" systems such as anaerobic formulations.

SUMMARY OF THE INVENTION

The present invention solves the problem of undesirably low pH and acid drift by providing an anaerobic composition containing at least about 0.1 milliequivalent of strong acid and/or equivalent strong acid precursors and stabilized against degradation caused by strong acid, comprising:

(a) at least one acrylate or methacrylate monomer;

(b) a free radical initiator in sufficient concentration to initiate cure of the monomer upon exclusion of oxygen;

(c) optionally, an inhibitor of free radical polymer in sufficient concentration to prevent cure of the monomer prior to exclusion of oxygen;

(d) optionally, an accelerator of free radical polymer; and (e) as a stabilizer against degradation caused by strong acid, about 0.1 to about 10 percent by weight of the total composition of an epoxy.

The present invention is also directed to a method of correcting and preventing excessively low pH and acid drift, said method comprising incorporating (preferably dissolving) in an anaerobic composition comprising items (a) to (d), above, about 0.1 to about 10 percent by weight of the total composition of an epoxy.

DETAILED DESCRIPTION OF THE INVENTION

The present invention is of general applicability to anaerobic monomers containing strong acids and/or chemical species which can generate strong acids in situ upon standing under ordinary storage conditions. Typical of such chemical species would be labile esters which can hydrolyze to strong acids. The strong acids to which this invention is directed are to be distinguished from such organic acids as methacrylic acid which, while it does tend to form in situ, is not sufficiently strong to significantly degrade the performance or stability of the anaerobic composition.

The class of monomers most benefited by this invention is that described in detail in the above-cited U.S. Pat. No. 2,895,950 and represented by the formula:

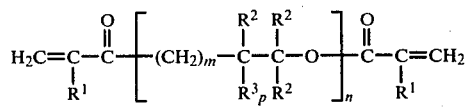

wherein $R^2$ represents a radical selected from the group consisting of hydrogen, lower alkyl of from 1 to about 4 carbon atoms, hydroxy alkyl of from 1 to about 4 carbon atoms, and

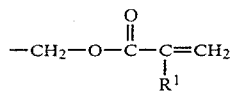

$R^1$ is a radical selected from the group consisting of hydrogen, halogen, and lower alkyl of from 1 to about 4 carbon atoms; $R^3$ is a radical selected from the group consisting of hydrogen, hydroxyl, and

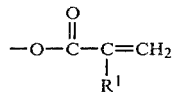

m may be 0 to about 12, and preferably from 0 to about 6; n is equal to at least 1, e.g., 1 to about 20 or more, and preferably between about 2 and about 6; and p is 0 or 1.

The polymerizable polyacrylate esters corresponding to the above general formula are exemplified by, but not restricted to, the following materials: di-, tri- and tetraethyleneglycol di-methacrylate; dipropyleneglycol dimethacrylate; polyethylene-glycol dimethacrylate; di(-pentamethyleneglycol) dimethacrylate; tetraethyleneglycol diacrylate; tetraethyleneglycol di(chloroacrylate); diglycerol diacrylate; diglycerol tetramethacrylate; tetramethylene dimethacrylate; ethylene dimethacrylate; and neopentylglycol diacrylate.

While polyacrylate esters, especially the polyacrylate esters described in the preceding paragraphs, have been found particularly desirable, monofunctional acrylate esters (esters containing one acrylate group) also may be used.

The most common of these monofunctional esters are the alkyl esters such as methyl methacrylate, ethyl methacrylate, propyl methacrylate ad isobutyl methacrylate. Many of the lower molecular weight alkyl esters are quite volatile and frequently it is more desirable to use a higher molecular weight homolog, such as decyl methacrylate or lauryl methacrylate.

When dealing with monofunctional acrylate esters, it is preferable to use an ester which has a relatively polar alcoholic moiety. Such materials are less volatile than low molecular weight alkyl esters and, in addition, the polar group tends to provide intermolecular attraction in the cured polymer, thus producing a more durable seal. Most preferably the polar group is selected from the group consisting of labile hydrogen heterocyclic ring, hydroxy, amino, cyano, and halogen polar groups. Typical examples of compounds within this category are cyclohexylmethacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

Other acrylates, such as ethoxylated bisphenol-A dimethacrylate, related compounds and their derivatives, can also be used. However, when such other acrylates are used, they often are used in combination with one or more members from either or both of the above-described classes of acrylate monomers. Most preferably, polyacrylates having the chemical formula given above, comprise at least a portion, preferably at least about fifty percent by weight of the acrylates used since these monomers have been found clearly superior in many anaerobic adhesive and sealant applications.

It will be appreciated that other monomers, for example, the bisphenol-A derivatives taught by U.S. Pat. No. 3,944,521 to Bradley et. al., will be helped by the present invention. The only limitations on the applicable monomers are the presence therein of strong acids and-/or strong acid precursors, and preferably, the ability of the monomer to dissolve the particular epoxy in use.

As indicated above, the anaerobic compositions as discussed herein are prepared by mixing a free radical initiator with one or more acrylate esters as described above. While certain peroxides (generally dialkyl peroxides) have been disclosed as useful initiators in, e.g., U.S. Pat. Nos. 3,419,512 to Lees, and 3,479,246 to Stapleton, the hydroperoxides are far superior and constitute a highly preferred embodiment.

The real benefit of the nonhydroperoxide initiators is as co-initiators with the hydroperoxides to make the cure properties of the anaerobic composition more universal.

Hydrogen peroxide may be used, but the most desirable polymerization initiators are the organic hydroperoxides. Included within this definition are materials such as organic peroxides or organic peresters which decompose or hydrolyze to form organic hydroperoxides in situ. Examples of such peroxides and peresters are cyclohexyl and hydroxycyclohexyl peroxide and t-butyl perbenzoate, respectively.

While the nature of the organic hydroperoxides is not critical to the broad concept of this invention, the general class of hydroperoxides can be represented by the formula $R^4$ OOH, wherein $R^4$ generally is a hydrocarbon group containing up to about 18 carbon atoms, and preferably is an alkyl, aryl or aralkyl hydrocarbon group containing from about 3 to about 12 carbon atoms. Naturally $R^4$ can contain any substituent or linkage, hydrocarbon or otherwise, which does not affect the hydroperoxide adversely for the purpose disclosed herein. Typical examples of such organic hydroperoxides are cumene hydroperoxide, tertiary butyl hydroperoxide, methylethylketone hydroperoxide, and hydroperoxides formed by oxygenation of various hydrocarbons such as methylbutene, cetane, and cyclohexene, and various ketones and ethers, including certain compounds represented by the formula above.

The organic hydroperoxide initiators can be used within wide ranges, e.g., up to about 20 percent by weight of the composition. Most commonly, however, they comprise no more than about 10 percent by weight of the composition since above that level adverse effects on the strength and durability of the cured composition may be experienced. While in some instances lower amounts can be used, about 0.1 percent by weight of the composition is a common lower limit. Preferably the hydroperoxide initiator comprises from about 0.1 percent to about 5 percent by weight of the composition.

Common additives for anaerobic compositions are latent polymerization accelerators, compounds which do not of themselves initiate cure, but which accelerate the cure once it has been started by the polymerization initiator. It should be noted that large numbers of polymerization accelerators are known in the art, and the broad concept of this invention is intended to encompass any polymerization accelerator which can be incorporated in the anaerobic composition without destroying the essential characteristics of such composition.

Among the most common of the accelerators used in anaerobic compositions are the organic amines, including primary, secondary, tertiary and polyamines. Particularly useful are the alkyl aryl amines, such as dimethyl-para-toluidene. Also very commonly used as accelerators are the organic sulfimides. A highly preferred composition is that which contains a sulfimide, particularly benzoic sulfimide, in combination with either a heterocyclic secondary amine or a tertiary N,N-dialkyl aryl amine. For an expanded discussion of this type of system, reference is made to U.S. Pat. No. 3,218,305. Amine-containing anaerobic compositions are also discussed in U.S. Pat. Nos. 2,895,950; 3,041,322; 3,043,820; 3,435,012; 3,425,988, among others. The patents mentioned in this specification are incorporated by reference.

Routine testing easily will determine the optimum amount of accelerator which can be incorporated in a given anaerobic composition. However, the following general guidelines may be used. With regard to tertiary amines, large amounts may be used if desired, up to about 8 percent by weight of the composition, or higher. However, little if any additional benefit is obtained above about 5 percent. Most preferably these tertiary amine accelerators are used at from about 1 percent to about 4 percent by weight of the anaerobic composition. The succinimide, phthalamide and formamide accelerators also can be used in significant amounts, up to about 8 percent by weight of the composition, or higher, and preferably from about 0.2 percent to about 5 percent by weight. Sulfimide and heterocyclic secondary amine accelerators generally are used at less than about 4 percent by weight of the anaerobic composition. In the special case where a sulfimide is used in combination with a heterocyclic secondary amine or an N,N-dialkyl arylamine, the total of the two accelerators preferably does not exceed about 4 percent by weight of the anaerobic composition, and either component does not exceed about 3½ percent by weight.

Other ingredients can be used in the anaerobic compositions useful in this invention, and in its preferred aspects polymerization inhibitors are includes to offer protection against spurious polymerization prior to the time of intended use. The quinones have been found to be a particularly effective class of polymerization inhibitors, and can be used herein. Examples of such quinones are beta-naphthoquinone, 2-methoxy-1,4-naphthoquinone, and p-benzoquinone. Compositions containing such inhibitors are described more fully in U.S. Pat. No. 3.043,820, mentioned above.

Other typical functional ingredients, which can be used if desired to impart commercially desirable properties to the composition, are thickeners, dyes, adhesive agents, thixotropic agents, and plasticizers, especially those polyester plasticizers described in U.S. Pat. No. 3,794,610.

Such functional materials can be used in such combination and proportions as desired, provided they do not adversely affect the nature and essential properties of the composition. While exceptions may exist in some cases, these materials in toto generally do not comprise more than about 50 percent by weight of the total composition, and preferably not more than about 20 percent by weight of the composition. The above-described anaerobic compositions generally can be prepared by the use of any conventional mixing techniques. Certain other ingredients which may desirably be added may not possess ready solubility, and if such additives are used (e.g., silica) it may be desirable to use high-shear mixing.

As has been indicated, the gist of the present invention is to correct deleteriously low pH, i.e., below about 5, and to control and prevent so-called "acid drift." By this term is meant the tendency of the pH to become lower spontaneously during storage of the monomer or fully fomulated anaerobic composition, such lowering being caused by in situ formation of strong acids. The present invention permits both the neutralization of acid initially in fresh monomer, reclamation of monomer or anaerobic composition which has undergone lowering of pH during storage, as well as prevention of such pH lowering during future storage. Whereas a pH of about 6-8 is commercially desirable, the pH of unaccelerated monomers for anaerobic compositions often drifts down to pH 2-4 within one to two weeks at room temperature.

The benefits of this invention are accomplished by adding to an anaerobic composition about 0.1 to about 10 percent by weight based on the total composition of an epoxy. (The term "epoxy" as used herein means any organic compound containing an oxirane

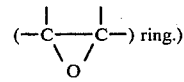

ring.)

Theoretically, there is no lower limit on the useful epoxy concentration, other than, of course, the need to provide at least a stoichiometric equivalent for the strong acid concentration present. It is preferred to have an excess of epoxy present, and the concentration of about 0.1 percent thus represents a practical minimum. Epoxy concentrations more than about 10 percent are preferably avoided since such concentrations tend to dilute the anaerobic composition and slow its cure or decrease its cured strength. Where the anaerobic composition contains substantial quantities of surfactants, such as taught in U.S. Pat. No. 4,069,378, epoxy concentrations above about 5 percent are preferably avoided since they may tend to reduce somewhat the activity of the anaerobic composition. Experimentation has indicated that an epoxy concentration in the range of about 0.2 percent to about 5 percent will be satisfactory for most conditions, and this is the preferred concentration range.

The minimum epoxy concentration for any given batch of anaerobic composition can be determined by routine experimentation. As a guide, however, experience indicates that commerically available monomers of the PEGMA type typically contain approximately 20-250 ppm strong acid.

It is a significant advantage of this invention that a substantial excess of epoxy over the stoichiometric minimum can be included. This provides intrinsic regulation of the pH at about the desired level of 6-8, notwithstanding the tendency for additional strong acid to form in situ during storage. Even though the epoxy acts as an active base, it has fortunately been found that even substantial excesses of epoxy, e.g., up to about 10 percent by weight, will not drive the pH of the monomer or anaerobic composition above about 8.

It is another particular advantage of this invention that the epoxy can exist and perform its intended function even in the presence of highly acidic and desired accelerators for the anaerobic polymer, such as saccharin, without noticeably degrading the performance of the accelerated composition.

It is highly preferred that the epoxy be soluble in the anaerobic composition for the obvious reason that homogeniety and reaction efficiency are improved thereby. Theoretically, however, a heterogeneous system, using an insoluble epoxy, is also possible, and this invention is meant to encompass such an epoxy and system also.

Useful epoxies include aromatics such as the epoxies of bisphenol-A, bisphenol-F, and styrene oxide; linears such as the epoxy of propylene glycol; complex organic oils such as epoxidized castor or soybean oil; epoxies containing a reactive moiety such as glycidyl methacrylate; among others.

The method of addition of the epoxy is not considered critical. Normal mixing procedures involving gradual addition with good stirring are adequate. Stirring should be continued until a solution (or adequate dispersion) is achieved. Modest heat, e.g., up to about 150° F., can be used to aid dissolution and enhance the neutralization reaction rate.

EXAMPLES

The following examples illustrate the invention but in no way limit it.

EXAMPLE 1

A bisphenol-A epoxy designated Epon 828 (Shell Chemical Company) having an epoxide equivalent of about 185–192 and a Brookfield viscosity at 25° C. of about 11,000–14,000 cp, and having the structural formula shown on page 15, wherein x is an integer from 0 to about 3, and was dissolved at a concentration of 0.1 percent by weight of the total composition in two TRIEGMA samples having different pH levels. The pH value was measured and the compositions were then stored at 130° F. for various periods of time and pH was periodically measured, with results shown in the following table. Storage at 130° F. constitutes an accelerated aging test, with good long-term product performance being predicted if the pH rises to, and/or remains, in approximately the 5–7 range.

TABLE I

| | Effect of Thermal Aging on pH | | | | | |
| | pH: Days at 130° F. | | | | | |
| Sample | Initial | 3 | 5 | 7 | 10 | 14 |
| --- | --- | --- | --- | --- | --- | --- |
| (A) Control* | 7.1 | 2.9 | 3.5 | 2.6 | 2.5 | — |
| (B) | 2.4 | 5.6 | 5.4 | 5.6 | 5.6 | 5.3 |
| (C) | 7.1 | 6.6 | 6.6 | 6.6 | 6.6 | 6.5 |

*no epoxy added

Sample (A) illustrates the typical downward drift in pH of untreated monomer. Sample (B) illustrates the reclaiming of a low pH monomer and its retention at a desirable pH level. Sample (C) shows that a monomer having an initial pH in the desirable range, or even somewhat on the high side, is moderated in pH and retained at the desired level by this invention.

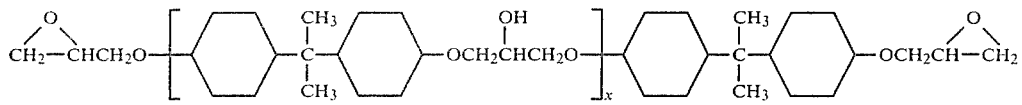

EXAMPLE 2

Two catalyzed monomer samples were prepared, each having the following composition: 70 parts TRIEGMA, 1 part PEGMA, 26 parts lauryl methacrylate, 2 parts cumene hydroperoxide, 0.3 part saccharin, 20 ppm quinone, and about 4 ppm tributylamine. In one sample was dissolved 0.1 percent by weight of the total composition the epoxy designated Epon 828; the other sample was left untreated as a control. The samples were stored at 120° F. for one week and were then "activated" by addition of 4 ppm of a reaction product of cupric carbonate and 2-ethylhexanoic acid. The samples were then placed in a water bath at 40° C. and the time for gellation to begin was observed. In this test, a gellation time of less than about 20 minutes is desirable after one week of storage at 120° F. (It has been empirically determined that one week of storage at 120° F. is equivalent to about 3 months' shelf life at room temperature.) If the gel (i.e., start of cure) time is over about 20–25 minutes at 40° C., the cure speed of the catalyzed composition is considered too slow to be commercially practicable. Test results were as follows:

TABLE II

| Effect of Thermal Aging on Gel Time: 40° C. Gel Time (minutes) | | |
| --- | --- | --- |
| Sample | Inital | Aged 1 Week at 120° F. |
| (D) Control* | 12 | >30 |
| (E) | 12 | 13 |

*no epoxy added

Sample (D) shows that a typical catalyzed anaerobic composition, which should remain rapidly curable even after prolonged storage, tends to greatly deteriorate in cure speed upon storage. In contrast, sample (E), treated per this invention, fully retained its cure speed during storage.

I claim:
1. An anaerobic composition, containing at least about 0.1 milliequivalent of strong acid and/or equivalent strong acid precursors and stabilized against degradation caused by strong acid, comprising:
   (a) at least one acrylate or methacrylate monomer;
   (b) a free radical initiator in sufficient concentration to initiate cure of the monomer upon exclusion of oxygen;
   (c) optionally, an inhibitor of free radical polymerization in sufficient concentration to prevent cure of the monomer prior to exclusion of oxygen;
   (d) optionally, an accelerator of free radical polymerization; and
   (e) as a stabilizer against degradation caused by strong acid, about 0.1 to about 10 percent by weight of the total composition of an epoxy selected from the group consisting of the epoxies of aromatic glycols and styrene oxide, linear epoxies of alkylene glycols, and epoxies of organic oils.
2. A composition of claim 1 wherein the initiator is an organic hydroperoxide.

3. A composition of claim 2 wherein the organic hydroperoxide is cumene hydroperoxide.

4. A composition of claim 2 wherein the monomer is polyethyleneglycol dimethacrylate.

5. A composition of claim 2 wherein the monomer is triethyleneglycol dimethacrylate.

6. A composition of claim 2 containing a sulfimide accelerator.

7. A composition of claim 6 wherein the sulfimide accelerator is saccharin.

8. A composition of claim 2 containing an amine accelerator.

9. A composition of claim 2 containing a quinone inhibitor.

10. A composition of claim 1 wherein the epoxy is dissolved in the anaerobic composition.

11. A composition of claim 1 wherein the epoxy is bisphenol-A epoxy.

12. A composition of claim 1 wherein the epoxy is bisphenol-F epoxy.

13. A composition of claim 1 wherein the epoxy is propylene oxide epoxy.

14. A composition of claim 1 wherein the epoxy is glycidyl methacrylate.

15. A composition of claim 1 wherein the concentration of the epoxy is about 0.2 to about 5 percent by weight of the total composition.

16. A method of stabilizing against degradation caused by strong acid an anaerobic composition containing at least about 0.1 milliequivalent of strong acid and/or equivalent strong acid precursors and comprising (a) at least one acrylate or methacrylate monomer;

(b) a free radical initiator in sufficient concentration to initiate cure of the monomer upon exclusion of oxygen;

(c) optionally, an inhibitor of free radical polymerization in sufficient concentration to prevent cure of the monomer prior to exclusion of oxygen;

(d) optionally, an accelerator of free radical polymerization;

said method comprising including in the anaerobic composition, as a stabilizer against degradation caused by strong acid, about 0.1 to about 10 percent by weight of the total composition of an epoxy selected from the group consisting of aromatic glycols and styrene oxide, linear epoxies of alkylene glycols, and epoxies of organic oils.

17. A method of claim 16 wherein the initiator is an organic hydroperoxide.

18. A method of claim 17 wherein the organic hydroperoxide is cumene hydroperoxide.

19. A method of claim 17 wherein the monomer is polyethyleneglycol dimethacrylate.

20. A method of claim 17 wherein the monomer is triethyleneglycol dimethacrylate.

21. A method of claim 17 containing a sulfimide accelerator.

22. A method of claim 21 wherein the sulfimide accelerator is saccharin.

23. A method of claim 17 containing an amine accelerator.

24. A method of claim 17 containing a quinone inhibitor.

25. A method of claim 16 wherein the epoxy is dissolved in the anaerobic composition.

26. A method of claim 16 wherein the epoxy is bisphenol-A epoxy.

27. A method of claim 16 wherein the epoxy is bisphenol-F epoxy.

28. A method of claim 16 wherein the epoxy is propylene oxide epoxy.

29. A method of claim 16 wherein the epoxy is glycidyl methacrylate.

* * * * *